United States Patent [19]

Dicke

[11] 4,407,344

[45] Oct. 4, 1983

[54] DOVETAIL FIXTURE

[75] Inventor: William C. Dicke, Easley, S.C.

[73] Assignee: The Singer Company, Stamford, Conn.

[21] Appl. No.: 284,878

[22] Filed: Jul. 20, 1981

[51] Int. Cl.³ .............................. B27F 1/14; B27F 1/10
[52] U.S. Cl. .................................. 144/87; 33/174 G; 144/144.5 R
[58] Field of Search ........... 144/85, 87, 134 D, 136 C, 144/144 R, 144.5; 409/125, 130; 33/174 G

[56] References Cited

U.S. PATENT DOCUMENTS 4,074,736   2/1978   Wolff .................................. 144/144.5
4,168,730   9/1979   Keller .................................... 144/87

FOREIGN PATENT DOCUMENTS 2069405   8/1981   United Kingdom ............. 144/144.5

Primary Examiner—W. D. Bray
Attorney, Agent, or Firm—Edward P. Schmidt; Robert E. Smith; Edward L. Bell

[57] ABSTRACT

A dovetail fixture for guiding a cutting tool in cutting mortises and tenons is described which can be simply used in cutting mortises and tenons at either of two selectable pitches. The fixture includes a base equipped with a horizontal table or work receiving surface and a vertical apron or work receiving surface. The surfaces are adapted to support work pieces in orthogonal positions with the end of a horizontal work piece in abutting relation with the end of a vertical work piece. Also included is a first clamping means adapted to clamp the horizontal work piece against the horizontal work receiving surface and a second clamping means adapted to clamp the vertical work piece against the vertical work receiving surface in their abutting positions. A cutter guiding template is employed having one of its edges formed with a first series of alternating guide fingers and slots and having a second, opposite edge formed with a second series of alternating guide fingers and slots. The template is adapted to overlie one of the work pieces and to be clamped thereupon in a position such that the outer edges of one selected set of slots and fingers is in alignment with the outer surface of the work piece. The template is held in position by a pair of L-shaped angle support brackets pivotally mounted to the template. Each support bracket is mounted with the template by means of a single screw generally on the longitudinal center line of the template between the slotted edges so as to be pivotal therearound to selectively position the desired series of slots and fingers in tool guiding position.

1 Claim, 3 Drawing Figures

U.S. Patent    Oct. 4, 1983    4,407,344
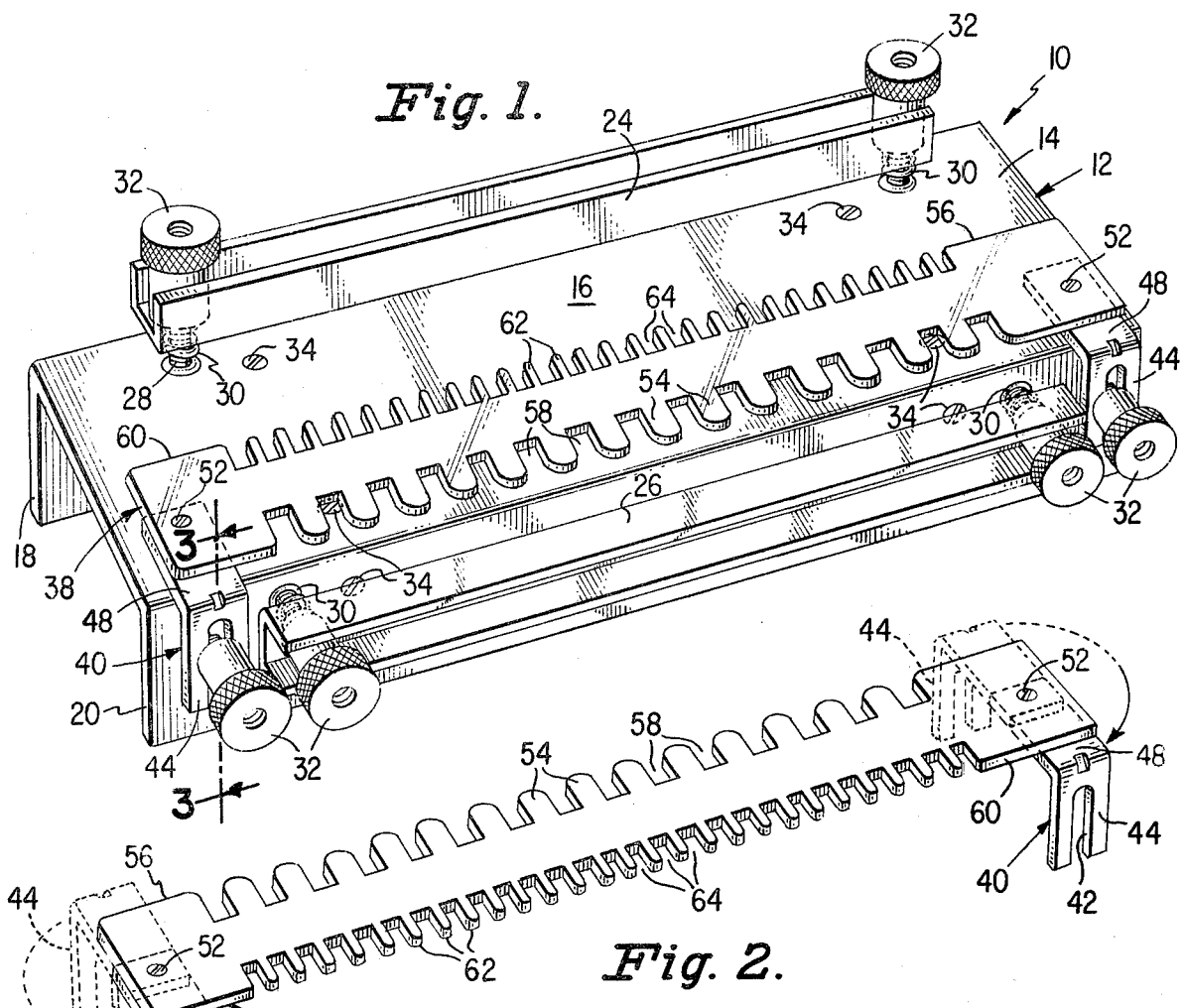

DOVETAIL FIXTURE

DESCRIPTION

FIELD OF THE INVENTION

This invention relates to dovetail fixtures for clamping and holding orthogonally disposed work pieces and for guiding a cutting tool as it cuts interlocking tenons and mortises in the work piece for effecting dovetail corner joints.

BACKGROUND OF THE INVENTION

Dovetail fixtures of the type envisioned herein are described in U.S. Pat. Nos. 1,679,074, 2,764,191, 3,057,383, 3,109,466, 3,800,840, 3,834,435 and in other patents. Such fixtures include a horizontal table and a vertical apron equipped with independent clamps by which the two work pieces, such as a drawer, box or bookcase sides and the like, can be rigidly held at right angles. A slotted guide member in the form of a comb or template is held against one of the work pieces to guide a router or similar cutting tool as the bit thereof traces the dovetail pattern. It has become standardized practice to provide such fixtures wherein the slotted guide member in the form of a comb or template has two selectable pitches or spacings for the fingers and slots thereof, enabling the making of the mating tenons and mortises as either a half inch pitch joint or a quarter inch pitch joint. Although it has been previously suggested, in the aforesaid U.S. Pat. No. 3,800,840, for example, to provide the comb-like fingers or teeth on different edges of the same template member, in such previously known fixtures it has been necessary to completely remove various screws, or the like, and reinsert the same in changing tool guidance from one template edge to another. Such operation is burdensome to the operator and the small screws, or the like, that must be removed and replaced are susceptible to being easily lost.

OBJECTS OF THE INVENTION

Bearing in mind the foregoing, it is a primary object of the present invention to provide a dovetail fixture having a comb-like template with differing pitch comb-like fingers along opposite edges thereof which may be quickly and easily positioned for use by the operator without requiring the removal and replacement of screws or other fastenings.

Another primary object of the present invention, in addition to the foregoing object, is the provision of such a dovetail fixture wherein L-shaped angle brackets are provided attached to the templates which need be only loosened and swiveled to the desired position whereat they may be again tightened to provide for pitch selection.

The invention resides in the combination, construction, arrangement and disposition of the various components parts and elements incorporated in improved dovetail fixtures in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention a dovetail fixture for guiding a cutting tool in cutting mortises and tenons is provided which can be simply used in cutting mortises and tenons at either of two selectable pitches, for example, one quarter inch or one half inch pitch. While these two pitches have become standardized, obviously any two desired pitches can be provided for. The fixture includes a base equipped with a horizontal table or work receiving surface and a vertical apron or work receiving surface. The surfaces are adapted to support work pieces in orthogonal positions with the end of a horizontal work piece in abutting relation with the end of a vertical work piece. Also included is a first clamping means adapted to clamp the horizontal work piece against the horizontal work receiving surface and a second clamping means adapted to clamp the vertical work piece against the vertical work receiving surface in their abutting positions. In a particularly important aspect of the invention, a cutter guiding template is employed having one of its edges formed with a first series of alternating guide fingers and slots at, for example, a half-inch pitch and having a second, opposite edge formed with a second series of alternating guide fingers and slots at, for example, a quarter-inch pitch. The template is adapted to overlie one of the work pieces and to be clamped thereupon in a position such that the outer edges of one selected set of slots and fingers is in alignment with the outer surface of the work piece. The template is held in position by a pair of L-shaped angle support brackets pivotally mounted to the template. Each support bracket is mounted with the template by means of a single screw generally on the longitudinal center line of the template between the slotted edges so as to be pivotal therearound to selectively position the desired series of slots and fingers in tool guiding position.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

FIG. 1 is a perspective illustration of a dovetail fixture constructed in accordance with the principles of the present invention;

FIG. 2 is a perspective illustration of the template part of the fixture of FIG. 1 illustrating how the angle support brackets therefore can be rotated for operator selection of the dovetail pitch; and FIG. 3 is an elevational cross section illustration taken along the line 3—3 of FIG. 1.

DETAILED DESCRIPTION OF THE INVENTION

With reference now to the drawing, there is shown and illustrated a dovetail fixture constructed in accordance with the principles of the present invention and designated generally by the reference character 10. The fixture 10 of this invention is independent of the cutting tool in the sense that substantially any of the portable routers in use can be used with the dovetail fixture 10. Because of its simplicity and, hence, ease of manufacture, it can also be modestly priced.

The fixture 10 comprises a frame, body, or base 12 of generally inverted U-shaped configuration and may, for example, comprise a section of aluminum extrusion. The base 12 comprises a table portion 14 defining a first or horizontal work supporting surface 16 and a pair of leg or apron portions 18 and 20 depending therefrom. The outermost surface of the leg or apron 20 defines a second or vertical work supporting surface 22 orthogonally related to the first or horizontal work supporting surface 16. In other words, the surfaces 16 and 22 are perpendicular one another. Work pieces are clamped to the respective work receiving surfaces by clamping members or bars 24 and 26 which may also comprise generally U-shaped extrusion sections. The clamping bars 24 and 26 are held by studs or screws 28 threadedly engaged in the table portion 14 and the apron 20, respectively. Compression springs 30 are provided around the screws 28, the surfaces 16 and 22 and the clamping bars 24 and 26 to bias the clamping bars 24 and 26 outwardly away from the respective work supporting surfaces 16 and 22. Thumb screws or knobs 32 are provided for moving the clamping bars 24 and 26 along the studs or screws 28 for clamping the work pieces against the work supporting surfaces 16 and 22.

The work pieces are laterally positioned relative one another by means of stop screws 34 in threaded holes in the table portion 14 and the apron 20 as is well known to provide for proper alignment of the completed mortises and tenons.

The dovetail fixture 10 further comprises a pair of threaded support posts 36 extending through the apron for carrying a comb-like template 38. The template 38 is adjustably supported on the studs 36 by means of generally L-shaped angle brackets 40. The angle brackets 40 are each provided with an elongated slot 42 in one leg 44 thereof and with a threaded aperture 46 in the other leg 48 thereof. In use, the slotted leg 44 is engaged over the stud 36 and clamped in position by means of a hand knob 50. The template 38 is adjustably secured with the angle brackets 40 by means of flat head machine screws 52.

The template 38, as heretofore pointed out, is constructed and arranged to enable guidance of a router tool, or the like, for producing dovetails of differing pitches or spacings between the respective mortises and tenons. Accordingly, the template 38 is provided with a first set of spaced apart fingers 54 along one edge 56 thereof defining, therebetween, alternating slots 58 for guiding a router tool, or the like. For example, the fingers 54 and the slots 58 may be spaced, for example, so as to provide a half inch pitch to the resulting mortises and tenons of the dovetail joint produced thereby. The opposite edge 60 of the template 38 is also provided with a series of fingers 62 alternating with slots 64 similar to the fingers 54 and slots 58 except being, for example, narrowerer, and providing guidance for the production of, for example, a quarter inch pitch dovetail joint.

With particular reference to FIG. 2, the template 38 of the fixture 10 may be selectively switched from being arranged for the production of half inch dovetail joints to quarter inch dovetail joints, or vise versa, by loosening the screws 52 and pivoting the brackets 40 from general alignment with the edge 56 to general alignment with the edge 60. Thereafter, the screws 52 may again be retightened and the template 38 reinstalled on the support screws 36.

Further, a lock nut 66 may be provided on each screw 56 securely holding it in position on the apron 20 and a spacer 68 be provided to enable the template 38 to be selectively positioned relatively inwardly or outwardly with respect to the vertical work piece supporting surface 22 depending on whether the support bracket 40 is positioned between the spacer 68 and the lock nut 66 or between the spacer 68 and the thumb nut or knob 32. In this manner, the dovetail fixture 10 may be quickly and readily adjusted to provide flush or rabbeted dovetailing of either one half or one quarter inch pitch spacing.

Although the invention has been described in terms of a preferred embodiment or modification, such technical equivalence to the means described as well as their combination, and such other embodiments or modifications as may be suggested to those having the benefit of the teachings herein are intended to be reserved should they be carried out according the spirit of the invention.

I claim:

1. Dovetail fixture for guiding a cutting tool in cutting mortises and tenons is provided which can be simply used in cutting mortises and tenons at either of two selectable pitches, comprising a base equipped with a horizontal table defining a first work receiving surface and a vertical apron defining a second work receiving surface adapted to support a pair of work pieces in orthogonal abutting relation, a first clamping means adapted to clamp one work piece against said first work receiving surface, a second clamping means adapted to clamp the other work piece against said second work receiving surface, a cutter guiding template having one of its edges formed with a first series of alternating guide fingers and slots at a first pitch and having a second, opposite edge formed with a second series of alternating guide fingers and slots at a second pitch, the template being adapted to overlie one of the work pieces and to be clamped thereupon in a position such that the outer edges of one selected set of slots and fingers is in alignment with the outer surface of the work piece, and a pair of L-shaped angle support brackets pivotally mounted to the template, each support bracket being mounted to the template by means of a single screw generally on the longitudinal center line of the template between the slotted edges so as to be pivotal therearound, each bracket also being selectively mountable on said base to thereby enable selective positioning of the desired series of slots and fingers in tool guiding position.

* * * * *